United States Patent

[11] 3,629,717

[72] Inventor Jorgen Peter Christian Vilhelm Bisgaard
Copenhagen, Denmark
[21] Appl. No. 717,461
[22] Filed Mar. 29, 1968
[45] Patented Dec. 21, 1971
[73] Assignee North American Philips Company Inc.
New York, N.Y.
[32] Priority Aug. 22, 1964
[33] Denmark
[31] 4162/64
Continuation of application Ser. No. 481,699, Aug. 23, 1965, now abandoned. This application Mar. 29, 1968, Ser. No. 717,461

[54] CIRCUIT ARRANGEMENT FOR STABILIZING AGAINST VARIATIONS IN TEMPERATURE AND SUPPLY VOLTAGE
13 Claims, 10 Drawing Figs.

[52] U.S. Cl. ........ 330/23, 330/24, 330/17, 330/13
[51] Int. Cl. ........ H03f 1/32, H03f 3/04
[50] Field of Search ........ 330/13, 15, 23, 28, 40

[56] References Cited
UNITED STATES PATENTS

| | | | |
|---|---|---|---|
| 2,892,165 | 6/1959 | Lindsay | 330/23 X |
| 3,237,119 | 2/1966 | Gewirtz | 330/28 X |
| 3,258,606 | 6/1966 | Meadows | 330/23 X |

OTHER REFERENCES
Semiconductor Engineering File, Raytheon File No. 154-T, Dec. 1960, pp. 1 & 2

*Primary Examiner*—Nathan Kaufman
*Attorney*—Frank R. Trifari

ABSTRACT: A temperature dependent element for bias stabilizing transistors comprises a transistor connected as a negative feedback amplifier with a voltage divider for applying a predetermined portion of the collector-emitter voltage to the base. The collector-emitter path of the transistor is connected in parallel with the emitter-base paths of the transistors to be stabilized. A resistor connected between the divider and the operating source may be provided to stabilize the bias of the transistors against supply voltage variations.

INVENTOR.
J.P.C.V. BISGAARD
BY
Frank R. Jinfani
AGENT

INVENTOR
J. P. C. V. BISGAARD
BY
Frank R. Trifari
AGENT

CIRCUIT ARRANGEMENT FOR STABILIZING AGAINST VARIATIONS IN TEMPERATURE AND SUPPLY VOLTAGE

This application is a continuation of Ser. No. 481,699 filed Aug. 23, 1965 and now abandoned.

This invention relates to a circuit arrangement for stabilizing against variations in temperature particularly to a circuit arrangement for stabilizing the working points of a plurality of transistors against variations in temperature and supply voltage, by means of a temperature-dependent element coupled to the series connection of the emitter-base paths of the transistors, more particularly a class B push-pull amplifier having complementary transistors, the bases of which are supplied with signals of the same phase and are biased from said circuit arrangement.

In transistorized circuit arrangements there is often a need for establishing a working point for the transistors, which is stabilized against variations in temperature and supply voltage. This applies especially to transistors operating at high powers.

It is possible to stabilize the working point against temperature variations by selecting the emitter resistor of sufficiently high value, but the use of such a high value of the emitter resistor gives no expedient solution when high powers are concerned, because of the great losses thereby introduced. Other possibilities consist in using NTC-resistors and voltage-stabilizing diodes, which possibilities are, however, not always suitable such as it will appear from the following description in which a known circuit arrangement by way of an example more particularly an often used amplifier circuit will be described in connection with the accompanying diagrammatical drawings, wherein FIGS. 1 and 2 show diagrams of amplifiers including known arrangements for stabilizing the working point of the transistors.

Figure 1:
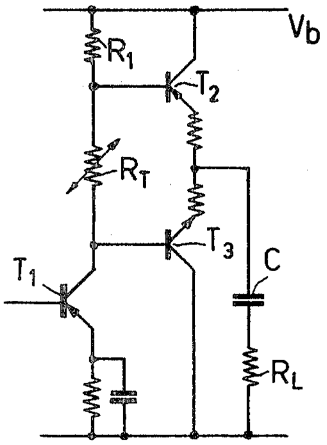
Figure 2:
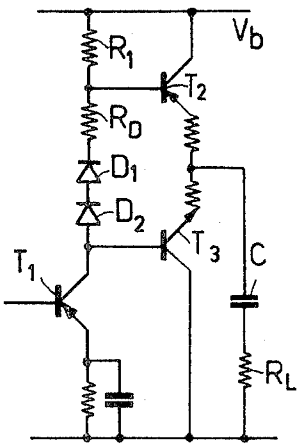

FIGS. 1 and 2 show diagrams of known amplifiers containing a driver transistor $T_1$ which is connected in common emitter arrangement with a load resistor $R_1$ in the collector circuit between the collector and a supply voltage source $V_B$. From the collector circuit two signals of same phase are supplied to the bases of two complementary transistors $T_2$ and $T_3$ which are connected as emitter followers in a so-called "single-ended" push-pull circuit arrangement. The emitters of said transistors are via a capacitor C connected to a common load resistor $R_L$.

With a view to current consumption and in order to obtain a high efficiency, amplifiers of this type are set to work in class B but as the transistors are not quite ideal amplifier elements, it is necessary to provide a quiescent current through the transistors $T_2$ and $T_3$ in order to avoid crossover distortion. Such quiescent current may be produced by applying to the bases of the transistors $T_2$ and $T_3$ a low bias relatively to one another by means of a circuit element, through which the current of the driver transistor flows and provides a small voltage drop. This voltage drop is applied between the basis of transistor $T_2$ and $T_3$.

As the value of the quiescent current in the two transistors $T_2$ and $T_3$ is very critical in that a too low value will cause the above-mentioned distortion to occur, whilst a too high value besides being the reason of heavy losses, may give rise to thermal instability, especially at high temperatures, it is of essential importance to maintain said quiescent current at its optimum value irrespective of variations in temperature and supply voltage. As the transistors $T_2$ and $T_3$, like all transistors, are highly temperature dependent, the current through the transistors increasing with increasing temperatures, measures have to be taken in order to ensure that the bias applied to the transistors is reduced when their temperature increases either because of a rise of ambient temperature or as a consequence of the inevitable losses occurring when powerful signals are amplified, whilst the bias has to be increased when the temperature falls in order to avoid distortion when the circuit arrangement is to work at low temperatures. Further, care should be taken to prevent variations in the supply voltage from causing essential variation in the voltage set up across the circuit element.

For the purpose of providing temperature stabilization of the quiescent current, it is known to use a resistor $R_T$ (FIG. 1) with a negative temperature coefficient, which resistor is located at the immediate vicinity of the transistors $T_2$ and $T_3$ and is, consequently, thermally coupled thereto.

However, such a solution is unsuitable for maintaining the bias for the transistors $T_2$ and $T_3$ constant against variations in the supply voltage.

Another known, and essentially more expensive, method of providing temperature stabilization of the quiescent current through the transistors $T_2$ and $T_3$ consists in using one or more diodes $D_1$ and $D_2$ (FIG. 2) instead of the resistor $R_T$. If using junction diodes of the same material as that of the transistors $T_2$ and $T_3$, corresponding temperature dependency will be attained for the stabilizing circuit element and for the transistor or transistors to be stabilized. Moreover, it applies to such diodes that the voltage drop across them is to a high extent independent of the current flowing through the diodes. Thus, measurements have shown that if germanium transistors are used, it is necessary to provide a reduction in the bias of about 2.5 mv./° C. for each transistor in order to maintain the quiescent current constant against changes in temperature, which variation agrees relatively well to the voltage variation per degree across each individual diode. For the purpose of producing the optimum quiescent current in the transistors $T_2$ and $T_3$ it is necessary, in addition to diodes, to insert a small resistor $R_D$ in the stabilizing circuit. The insertion of such resistor has, however, the effect that the bias applied to transistors $T_2$ and $T_3$ is no longer independent of the supply voltage.

This invention provides a circuit arrangement for stabilizing the working point of a plurality of transistors, which does not have the above-mentioned drawbacks According to the invention the temperature-dependent element is constituted by a transistor, the stabilizing transistor. A voltage divider is connected between the collector and emitter of the transistor and the base of the transistor is connected to a tapping on the voltage divider. The transistor is connected as a negatively feedback amplifier in connection with a load resistor. The emitter and collector of said transistor are connected to the ends of said series connection of the emitter-base paths.

Figure 3:
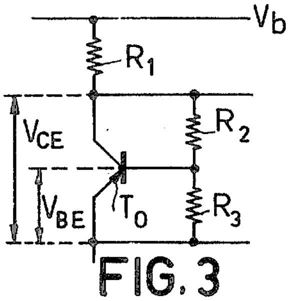
Figure 4:
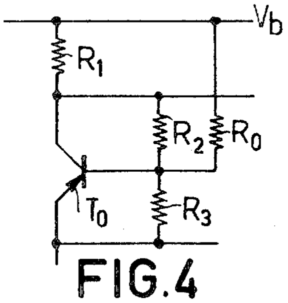
Figure 5:
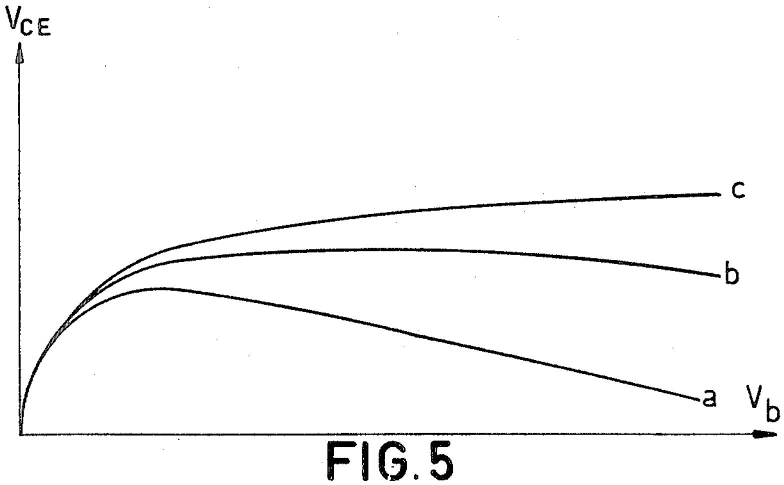
Figure 6:
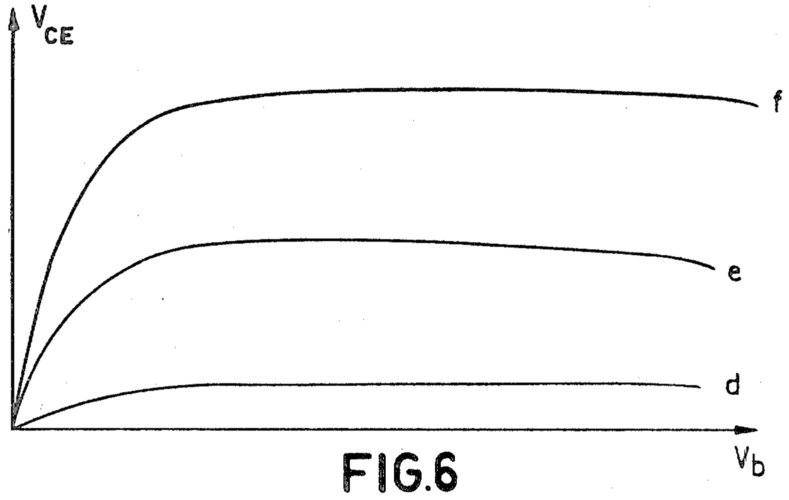
Figure 7:
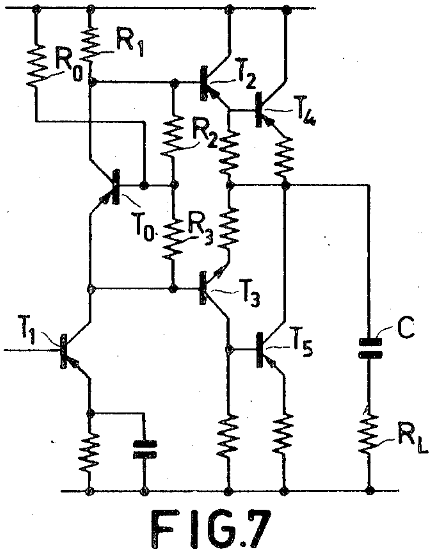
Figure 8:
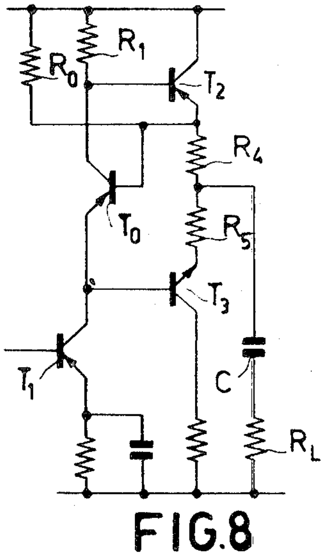
Figure 9:
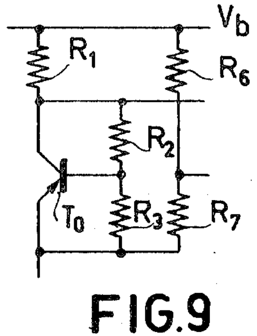
Figure 10:
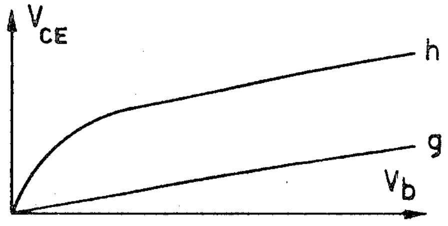

Circuit arrangements of said stabilizing transistor according to the invention and by way of example, to which the invention will not be restricted, the use of said stabilizing transistor in amplifier circuits will now be described and explained in connection with the accompanying diagrammatical drawings in which FIGS. 3 and 4 show circuit arrangements according to the invention, FIGS. 5 and 6 are curves for explaining the mode of operation of the arrangement shown in FIG. 4, FIGS. 7 and 8 are amplifiers including circuit arrangements according to the invention, FIG. 9 is a modification of the circuit arrangement shown in FIG. 3, and FIG. 10 is a curve for explaining the mode of operation of the circuit arrangement according to the invention shown in FIG. 9.

In the various Figures elements corresponding to each other have been provided with the same reference numbers.

An embodiment of such circuit arrangement according to the invention is illustrated in FIG. 3. The circuit arrangement includes a transistor $T_O$ between the emitter and collector of which a voltage divider is connected which is here constituted by two resistors $R_2$ and $R_3$. The resistance value of the resistor $R_1$ is higher than the inner base-input resistance of the transistor $T_Q$. However, the sum of values of the resistors $R_1$ and $R_2$ are chosen such that the emitter-collector current of the transistor $T_O$ is higher than the current through the resistors $R_3$ and $R_2$. The base of the transistor $T_O$ is connected to the junction of the resistors $R_2$ and $R_3$ whereby the transistor $T_0$ together with the load resistor $R_1$ is connected as a negatively DC feedback amplifier. The voltage $V_{CE}$ occurring across the emitter-collector path may be expressed as $$V_{CE}=(R_2+R_3)/(R_3)\ V_{BE}$$

where $V_{BE}$ is the voltage across the emitter-base path.

As the emitter-base voltage $V_{BE}$ is of the same order of magnitude as the bias to be applied to each one of the series-connected emitter-base paths in the transistors, the working points of which are to be stabilized by the circuit arrangement, it will be understood that it is possible through suitable choice of the voltage divider ratio to provide across the transistor $T_0$ the total bias for the series-connection of the emitter-base paths in the transistors to be stabilized, and at the same time the desired dependency of the bias on the temperature is attained in that a variation of the temperature will produce a change of the emitter-base voltage $V_{BE}$ which multiplied in the transistor $T_0$ is applied to the series-connection of the emitter-base paths in the transistors to be stabilized. If the supply voltage varies and, for example, decreases, the current through the voltage divider will likewise decrease for which reason the voltage applied to the base of the transistor $T_0$ drops so that the transistor becomes less conductive, whilst the voltage on the collector increases so that the drop in the supply voltage which through the resistor $R_1$ is transferred to the collector of the transistor $T_0$, is substantially compensated for at the expense of a drop in the current through the transistor $T_0$. The basis for the transistors to be stabilized is hereby made substantially independent of the supply voltage.

By means of the circuit arrangement shown in FIG. 3 it is not possible to compensate completely for variations in the supply voltage as the voltage applied to the base of the transistor $T_0$ has to vary with the supply voltage. In order to attain a further increase in the efficiency of the circuit arrangement with respect to compensating for supply voltage variations, the circuit arrangement according to the invention may be provided with a resistor, one end of which is connected to the base of the stabilizing transistor, and the other end of which is connected to a point having a voltage dependent on the supply voltage. An example of such a circuit arrangement is shown in FIG. 4 where the additional resistor $R_0$ is connected between the base and the supply voltage. FIGS. 5 and 6 illustrate curves which have been obtained by measuring a practical circuit arrangement of the type shown in FIG. 4 where the resistors $R_1$, $R_2$ and $R_3$ had the values 4.7 kΩ, 1 kΩ and 470 Ohm, respectively. The voltage $V_{CE}$ across the transistor $T_0$ has been depicted as a function of the supply voltage $V_b$. In FIG. 5 the resistor $R_0$ has been chosen as parameter and had for the curves *a*, *b*, and *c* the values 47 kΩ, 100 kΩ and 220 kΩ, respectively. It will be seen that for a certain value of $R_0$ the curve is substantially horizontal. With this value of $R_0$, i.e. 100 kΩ, corresponding curves having the temperature as parameter are illustrated in FIG. 6, the curves *d*, *e*, and *f* corresponding to the temperatures +55, +20 and −15° C., respectively. It will be seen that the curves remain substantially horizontal irrespectively of the temperature, and that the voltage $V_{CE}$ across the transistor $T_0$ falls with increasing temperatures.

Furthermore, the resistor $R_0$ provides the possibility of setting the quiescent current at the most favorable value in the transistors to be stabilized by means of the circuit arrangement.

In an embodiment of the circuit arrangement according to the invention the voltage divider is constituted by two resistors having such a ratio that $1/n$ of the voltage across the collector-emitter path is applied to the base, where $n$ is the desired amplification of the temperature dependency of the emitter-base path. Consequently, it is extremely simple to find the required voltage divider ratio; and for the stabilization of for example two transistors the emitter-base paths of which are connected in series, parallel to the transistor $T_0$, in which case a bias is desired the variations of which in dependence on the temperature is twice that of a single emitter-base path, it is possible to use resistors $R_2$ and $R_3$ of the same value whilst, if three transistors are to be stabilized, it is possible to use a resistor $R_2$ between collector and base the value of which is twice that of the resistor $R_3$ between base and emitter.

FIG. 7 shows an amplifier including four transistors $T_2$, $T_3$, $T_4$, and $T_5$ in the known Darlington connection. The amplifier is stabilized by a circuit arrangement according to the invention. The amplifier includes three transistors $T_2$, $T_3$ and $T_4$ the emitter-base paths of which are connected in series across the circuit arrangement which provides a suitable bias and consists of the transistor $T_0$, the resistors $R_2$ and $R_3$, and the resistor $R_0$. The value of resistor $R_2$ is twice the value of resistor $R_3$ whereby the transistor $T_0$ provides a trebling of the temperature dependency in the emitter-base path of the transistor $T_0$.

In this and further figures of shown amplifier circuits the transistor $T_1$ is the said driver transistor. It will be remarked that it is possible to connect the base of the transistor $T_1$ in a known way, not shown, through a resistor to a further point of the amplifier, for example to the output point, to which the load is connected, and through an other resistor to a point of constant potential, as to contain a feedback and to stabilize the potential of the said output point of the amplifier.

According to another simplified embodiment of the circuit arrangement according to the invention, the voltage divider may be constituted by the emitter-base paths of the transistors the working points of which are to be stabilized, the base of the transistor in the circuit arrangement being connected to a point in the series connection of the emitter-base paths of the transistors to be stabilized. In a further embodiment of such a circuit arrangement where the series-connection includes emitter resistors, the base of the stabilizing transistor is according to the invention connected to such point of the series-connection, especially directly to one of the emitters, that in addition a voltage dependent on the current flowing through the transistors to be stabilized is applied to the base of the stabilizing transistors.

The amplifier shown in FIG. 8 comprises two series-connected emitter-base paths of the transistors $T_2$ and $T_3$ with associated emitter resistors $R_4$ and $R_5$ connected across the resistors $T_0$. The voltage divider required for the transistor $T_0$ is constituted by the emitter-base path of the transistor $T_2$ as one branch and the resistors $R_4$ and $R_5$ in connection with the emitter-base path of the transistor $T_3$ as the other branch, the base of the transistor $T_0$ being connected to the emitter of the transistor $T_2$. Hereby a further stabilization to obtained, for if the quiescent current through the transistors $T_2$ and $T_3$ for one reason or other tends to increase, the voltage drop across the resistors $R_4$ will also increase whereby the emitter-collector voltage across the transistor $T_0$ will decrease and tend to decrease the quiescent current.

As mentioned above it is possible by the resistor $R_0$ shown in FIG. 4 to obtain a complete stabilization of the emitter-collector voltage against supply voltage variations. Another possibility of attaining the same effect consists according to another embodiment of the circuit arrangement according to the invention in that one end of the emitter-collector path of the stabilizing transistor is connected to the series connection via a voltage divider to which a voltage dependent on the supply voltage is applied. Such a circuit arrangement is shown in FIG. 9 where between the supply voltage source and the emitter of the transistor $T_0$ provision has been made for a voltage divider consisting of resistors $R_6$ and $R_7$. At the tapping of this voltage divider a voltage will occur that is proportional to the supply voltage such as it is shown by the curve *g* in FIG. 10. FIG. 10 further comprises a curve *h* which shows the emitter-collector voltage of the transistor $T_0$ as a function of the supply voltage $V_b$. It will be seen that it is possible to choose a suitable ratio between resistors $R_6$ and $R_7$ so that the curves *g* and *h* will be parallel over a large range whereby the voltage difference between the voltage divider tapping and the collector of the transistor $T_0$ will be substantially independent of the supply voltage. This embodiment affords the further advantage that the bias to be applied to the transistors to be stabilized may be caused to change polarity with increasing temperatures in that the voltage drop across the transistor $T_0$ at high temperatures can assume a smaller value than the voltage drop across the resistor $R_7$. This has the effect that the temperature stabilization will be effective even at very high temperatures.

For the sake of good order it should be mentioned that it is known per se to use the temperature dependency of a transistor for providing stabilization of a single transistor.

It will be obvious that the circuit arrangement according to the invention may be used not only for stabilizing the working points for class B push-pull amplifier having complementary transistors but other applications of the circuit arrangement according to the invention are also possible. Though the drawing shows the use of PNP-transistors in the circuit arrangement according to the invention, it will be obvious that also NPN-transistors may be used, and many modifications may be made within the scope of the invention. Under certain circumstances it may furthermore be desirable to insert a voltage stabilizing element, for example a zener diode, in the emitter circuit of the stabilizing transistor.

What is claimed is:

1. In a transistor amplifier of the type having a plurality of transistors with their emitter-collector circuits connected in a series path between first and second terminals of a source of operating potential, a source of signals and load-impedance means connected in series between said first and second terminals, said load-impedance means comprises a fixed resistance in series with a variable resistance, and direct current conductive means connecting opposite ends of said variable resistance to the bases of separate transistors of said plurality of transistors; and improvement wherein said variable resistance is comprised of the emitter-collector path of a first transistor, comprising negative feedback means for applying between the emitter and base of said first transistor a voltage that is substantially equal to $1/n$ times the voltage between the collector and emitter of said transistor, wherein $n$ is the number of transistors in said series path between the transistors having their bases connected to opposite ends of said variable resistance.

2. A transistor amplifier circuit comprising an input stage, an output stage, and a source of potential having first and second terminals, said in stage comprising a first series circuit of a source of signals and load-impedance means connected in series between said first and second terminals, said load-impedance means comprising fixed resistor means having one end connected to said second terminal, variable resistor means connected between the other end of said fixed resistor means and said source of signals, and a separate output terminal connected to each end of said variable resistor means, said output stage comprising a second series circuit connected between the said output terminals, said second series circuit comprising the emitter-base path of at least one transistor, said variable resistor means comprising a transistor having its emitter electrode connected to one of said output terminals and its collector connected to the other of said output terminals, and negative feedback means connected to apply a potential between the emitter and base of said last-mentioned transistor substantially equal to $1/n$ times the collector-emitter voltage of said last-mentioned transistor, wherein $n$ is the number of transistors having emitter-base paths connected in series in said second series circuit.

3. In a circuit for bias stabilization of a transistor against variations in temperature by means of a temperature-dependent circuit direct coupled to the emitter-base path of said transistor, wherein said circuit comprises a source of operating potential having first and second terminals, a series circuit comprising fixed resistor means and temperature-dependent resistor means serially connected between said first and second terminals, a first transistor to be stabilized, means connecting the emitter-collector path of said first transistor between said first and second terminals, and direct current conductive means for connecting said temperature-dependent resistor means in parallel with the emitter-base path of said first transistor; the improvement wherein said temperature-dependent resistor means comprises a second transistor having its emitter-collector path connected in series in said series circuit, and negative feedback means for applying a predetermined proportion of the direct emitter-collector voltage of said second transistor between the emitter and base of said second transistor.

4. A transistor amplifier comprising a first stage, a second stage, a source of operating potential having first and second terminals, and a source of signals, said first stage comprising a first transistor, load-resistance means having fixed and temperature-dependent series connected portions, means serially connecting the emitter-collector path of said first transistor and said load-resistance means between said first and second terminals, said second stage comprising second and third complementary transistors, series circuit means connecting the emitter-collector paths of said second and third transistors serially between said first and second terminals, output means connected to said series circuit means between the emitter-collector paths of said first and second transistors, and first and second direct current conductive means connecting the bases of said second and third transistors respectively to opposite ends of said temperature-dependent portion, said temperature-dependent portion comprising a fourth transistor having its emitter connected to said first direct current conductive means and its collector connected to said second direct current conductive means, and negative feedback means connected to apply to the base of said fourth transistor a voltage that is a predetermined portion of the direct emitter-collector voltage of said fourth transistor, whereby said second and third transistors are bias stabilized for variation in temperature.

5. The amplifier in claim 4 comprising resistor means connecting the base of said fourth transistor to a point of potential having a voltage that is dependent upon said operating potential, whereby said second and third transistors are bias stabilized for variations in said operating potential.

6. The bias stabilization circuit of claim 5 wherein said negative feedback means comprises a voltage divider connected between the emitter and collector of said second transistor, said voltage divider having a tap connected to said base of said second transistor.

7. The bias stabilization circuit of claim 5 comprising a resistor connected between the base of said second transistor and a point of potential dependent upon said operation potential, whereby the bias of said first transistor is stabilized for variation in said operating potential.

8. The bias stabilization of claim 5 comprising a third transistor, a source of signals, means applying said signals between the emitter and base of said third transistor, and means connecting the emitter-collector path of said third transistor in series in said series circuit, whereby said fixed and temperature-dependent resistor means serve as a load impedance for said third transistor.

9. The amplifier of claim 4 wherein said predetermined portion is $1/n$, wherein $n$ is the number of transistors in said second stage having emitter-base paths in series between said first and second direct current conductive means.

10. The amplifier of claim 4 wherein said negative feedback means comprises a voltage divider connected between the emitter and collector of said fourth transistor and having a tap connected to the base of said fourth transistor.

11. The amplifier of claim 4 wherein said negative feedback means comprises means connecting the base of said fourth transistor to the portion of said series circuit means between said second and third transistors.

12. The amplifier of claim 11 in which said portion of said series circuit means comprises emitter resistors for said second and third transistors, and said base of said fourth transistor is connected to a point in said portion of said series circuit means whereby a voltage proportional to the current flowing through said second and third transistors is applied to said base of said fourth transistor.

13. The amplifier of claim 4 wherein one of said first and second direct current conductive means comprises a first resistor, comprising a second resistor connected between the end of said first resistor toward the base of the corresponding second and third transistor, and a point of potential that is dependent upon said operating potential, whereby said second and third transistors are bias stabilized for variations in operating potential.

* * * * *

PO-1050
(5/69)

UNITED STATES PATENT OFFICE
CERTIFICATE OF CORRECTION

Patent No. 3,629,717 Dated December 21, 1971

Inventor(s) JORGEN PETER CHRISTIAN VILHELM BISGAARD

It is certified that error appears in the above-identified patent and that said Letters Patent are hereby corrected as shown below:

In the claims, col. 5, line 45, cancel "in" and insert

-- input --;

Signed and sealed this 12th day of March 1974.

(SEAL)
Attest:

EDWARD M.FLETCHER,JR.
Attesting Officer

C. MARSHALL DANN
Commissioner of Patents